United States Patent [19]
Nelson

[11] 3,750,308
[45] Aug. 7, 1973

[54] EDUCATIONAL DEMONSTRATION MODEL

[76] Inventor: Donald E. Nelson, 4105 Schirtzinger Rd., Columbus, Ohio

[22] Filed: Feb. 12, 1971

[21] Appl. No.: 114,949

[52] U.S. Cl............................ 35/45, 35/19, 46/131
[51] Int. Cl. ............................................ G09b 27/02
[58] Field of Search.................. 35/19, 43, 45, 46 R, 35/47; 46/131

[56] References Cited
UNITED STATES PATENTS

| | | | |
|---|---|---|---|
| 1,355,799 | 10/1920 | Bradish............................ | 46/131 X |
| 1,996,600 | 4/1935 | Vass........................................ | 46/131 |
| 2,551,668 | 5/1951 | Goosmann............................ | 46/131 |
| 1,646,830 | 10/1927 | Mueller.................................. | 46/131 |
| 743,483 | 11/1903 | Gentry..................................... | 35/45 |
| 858,977 | 7/1907 | Hackeling.............................. | 35/45 |
| 1,286,728 | 12/1918 | O'Brien et al. ........................ | 46/131 |

OTHER PUBLICATIONS

Stansi Scientific Div., Catalog, Rec'd 2/20/1969, Q185F54 Gr. 336, Page 122.

*Primary Examiner*—Jerome Schnall
*Attorney*—Jerome R. Cox

[57] ABSTRACT

An educational demonstration model for demonstrating the principles of balance, and of the center of gravity, and the principles of the movement of the sun, the revolution of the earth around the sun, and the revolution of the moon around the earth. The device comprises a base with a substantially vertical member secured to and extending upwardly from the base, and with a spherical member balanced on the top of the vertical member and simulating the sun, and with members simulating the earth and the moon connected to the sun and mounted on rods so that they will revolve jointly around the sun and so that the moon will revolve around the earth. The large sphere is balanced on a point, and the smaller spheres representing the earth and the moon are connected to the sun by a rod so that they are offset from the center of the balance a distance so that the device may be balanced by means of a weight on the interconnecting rod and the center of gravity principle may be demonstrated. The smallest sphere representing the moon is mounted so that it may be made to revolve around the earth.

1 Claim, 3 Drawing Figures

PATENTED AUG 7 1973

INVENTOR
Donald E. Nelson
By
Jerome R. Cox

Jerome R. Cox

EDUCATIONAL DEMONSTRATION MODEL

BACKGROUND OF THE INVENTION

My invention relates to an educational demonstration model for the demonstration either of the principles of balance or the principle of the revolution of the earth around the sun, and the revolution of the moon around the earth, together with an indication of the movement of the sun in the universe.

Heretofore, educational devices have been provided for many purposes including devices for indicating the movement of the earth around the sun, and possibly the moon around the earth, but usually these have been complicated devices in which the earth is revolved around the sun by means of pulleys, belts, etc., and the movement of the earth controls the movement of the moon by gears, etc. Also, devices have been heretofore devised in the nature of scales by which weights are balanced against each other to show the principle of balancing.

My device, however, is a very simple device by which the instructor can easily demonstrate these principles without the requirement of complicated gearing, belts, etc., and can by the one simple device demonstrate the several principles involved.

OBJECTS

It is therefore an object of the invention to provide a device, simple in construction, inexpensive to manufacture, and yet effective and efficient in use, to serve as a demonstration model for the demonstration (1) of the movement of the earth and the moon around the sun, and of the moon around the earth, together with the movement of the sun itself, and also (2) to demonstrate the principles of balance and of center of gravity regardless of the weight of the objects and the length of the arms by which these objects are pivoted.

A further most important object of the invention is to provide a device of this character which is simple and easy to use.

Further objects and features of the invention will be apparent from a reading of the following specification and claims when considered in connection with the accompanying drawings illustrating preferred embodiments of my invention.

SUMMARY OF THE INVENTION

I have found that the foregoing and other objects may be obtained by an apparatus wherein there is provided an educational demonstration model comprising a base; an approximately vertical member secured to and extending upwardly from said base and having a flat surface at the upper end; a balancing device including a rod having a pointed end which rests on said flat surface, and having portions extending first outwardly, then downwardly, then inwardly, and then upwardly; and a slidable weight positioned on a rod forming a portion of said balancing device. Preferably, the device is so constructed that on one side of the pivot point there is a greater weight than on the opposite side of the pivot point, but on the opposite side there is a longer arm — thus illustrating that a smaller weight may by means of a longer arm balance a larger weight on the opposite side having a shorter arm.

DESCRIPTION OF THE PREFERRED EMBODIMENTS

Figure 1:
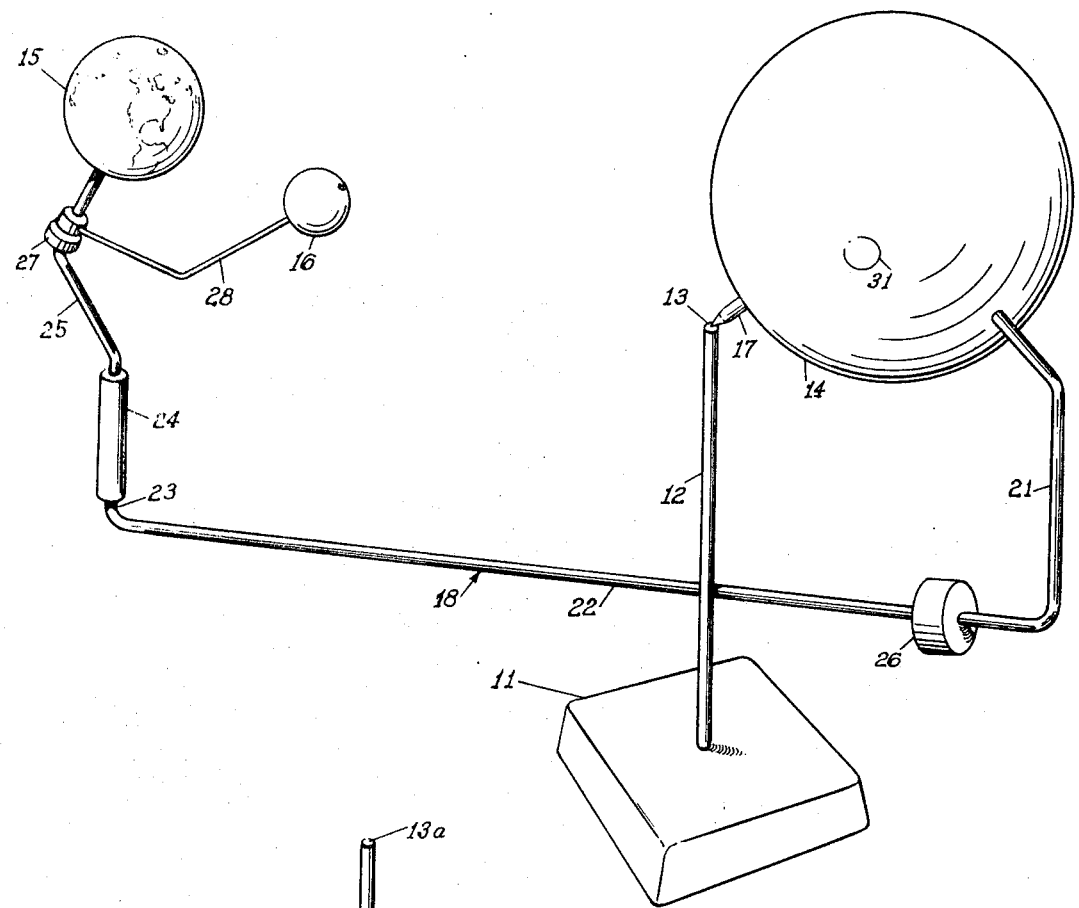
FIG. 1 is a view in side elevation of a device constructed according to my invention showing a base and a rod extending substantially vertically upwardly therefrom, having at its upper end a flat surface on which there is balanced the pointed end of a rod carrying a large sphere which is connected by rods to smaller spheres at the opposite side of the device.

Referring to FIG. 1 of the drawings, it may be seen that I have shown a base 11, having extending substantially vertically upwardly therefrom a substantially straight rod 12 having at its upper end a substantially flat surface 13. Balanced on the surface 13 is a balancing device which consists of a large sphere 14 simulating the sun, a smaller sphere 15 simulating the earth, and a still smaller sphere 16 simulating the moon, and interconnecting rods to allow the movement of the sphere 14, the rotation of the sphere 15 around the sphere 14, and the rotation of the sphere 16 around the sphere 15. This linkage includes a pointed rod 17 which has its point contacting the surface 13 and is thus balanced thereon. The rod 17 is connected at its opposite end to the sphere 14. Also connected to the sphere 14 at a point removed from the rod 17 is a bent rod 18. The rod 18 has a downwardly extending portion 21, a substantially horizontal portion 22 and an upwardly extending portion 23. Surrounding the upwardly extending portion 23 is a sleeve 24 into the upper end of which there is also inserted a bent rod 25. On the horizontally extending portion 22, there is mounted a weight 26 for balancing purposes, and on the bent rod 25 there is mounted a collar 27 to which there is secured a rod 28 supporting the sphere 16. The upper end of the rod 25 supports the sphere 15. The upper ends of the rods 12 and 12a may be provided with a disk of sandpaper such as the disk 13a shown in FIG. 2. The counterweight 31 tilts the structure so that normally the portion 22 tends to move out of contact with the rod 12.

Figure 2:
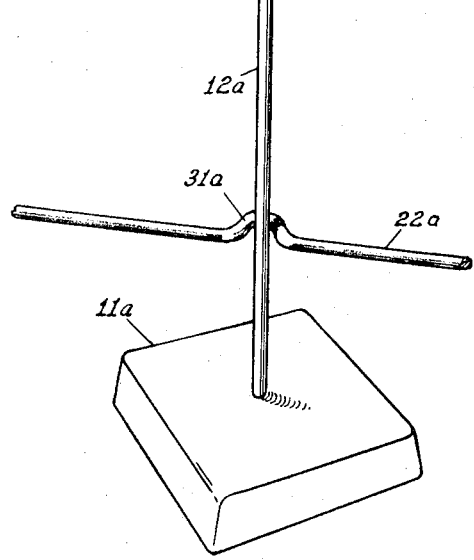
FIG. 2 is a fragmentary showing of an alternative device in which a portion of the long connecting rod is curved so as to minimize contact thereof with the vertical supporting rod.

In FIG. 2, the horizontal portion 22a is provided with a semi-circular curve 31a whereby it normally avoids contact with the upwardly extending rod 12a.

Means are provided tending to keep the horizontal portion of the balancing device separated from the vertically extending supporting rod. Thus in the embodiment shown in FIG. 1, the counterweight 31 tilts the balancing device sufficiently that the portion 22 of rod 18 moves away from the rod 12 (i.e. away from the viewer). In the embodiment shown in FIG. 2, the curve 31a is sufficient to keep the parts 12a and 22a separated.

Figure 3:
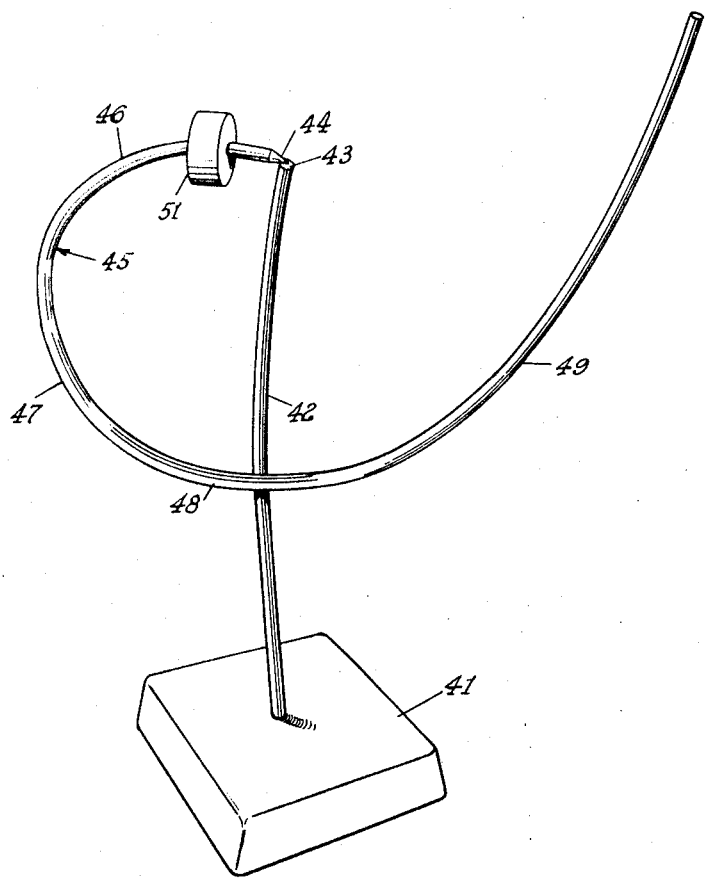
FIG. 3 is a view in elevation of a balancing device in which there is provided a curved rod extending substantially vertically upward from the base and wherein there is balanced on the top of the curved rod another curved rod extending first outwardly, then downwardly, then inwardly, and then upwardly so that the device shows the principles of balance and center of gravity.

Referring to FIG. 3, it may be seen that I have shown a base 41 having a substantially vertically upwardly extending support rod 42 (preferably curved as shown but may be straight if desired) which has an upper surface 43 on which there is balanced the pointed end 44 of a curved rod 45. The rod 45 has an outwardly extending portion 46, a downwardly extending portion 47, an inwardly extending portion 48 which extends past the vertically upwardly extending rod 42 and merges into an upward extending portion 49. Mounted on the curved rod 45 is a weight 51. The device of FIG. 3 may be used to demonstrate the principles of balance and of the center of gravity similarly to the device of FIG. 1 and the device of FIG. 2. The movement of the weight 51 will cause the rod 49 to assume various positions, in all of which positions the device will balance at the point 44 on the surface 43.

The curved rod 45 is the balancing rod. The surface 43 is the flat surface of the upright rod 42. The surface 43 is coated with a non-skid surface or small piece of sandpaper or similar material. As the balancing rod 45 moves up and down like an inverted teeter-totter, the non-skid surface prevents the sharp point from walking off of the surface 43. The curved rod 42 is fixed in the base 41 and curved in a plane perpendicular to the plane as shown by the rod 45. The device shown in FIGS. 1 and 2 is an alternative embodiment of the device shown in FIG. 3 inasmuch as it illustrates the same principles of balance and center of gravity, and also provides a model of the sun and moon by which the principles of the law of gravity and the attraction of the earth to the sun are illustrated. This is a demonstration of the relationship between the sun 14 and the earth 15 and the moon 16. The connecting rod 18 serves to illustrate the gravitational force of the earth to the sun. The earth can be rotated and can be tilted to illustrate the cause of the change of seasons. The device shown in FIG. 3 demonstrates the principle of the center of gravity. The weight 51 slides on the rod 45. The balancing rod balances in amazing positions and imbeds this principle on a student's mind.

In using the apparatus to teach the movement of the moon around the earth, the bent rod 25 may be removed from the sleeve 24 and the sub-assembly consisting of rod 25 sphere 15, rod 28 and sphere 16 may be used to demonstrate the movement of the moon 16 around the earth 15.

The device shown in FIG. 3 may be used for several games. For example (1) rings may be hung on (or thrown onto) curved rod 45 without knocking it off balance; (2) baskets may be added to rod 45 and and balls such as ping pong balls may be added (or thrown into) such baskets without knocking it off balance; (3) similarly targets may be added to rod 45 and knocked down without disturbing the balance; and (4) trays may be added on each side of rod 45 and tests may be made to find which of a plurality of balls weighs most with a minimum of weighing. Many other similar games may be devised.

It is to be understood that while the detailed drawings given describe preferred embodiments of my invention, they are for the purpose of illustration only, and various changes may be made therein without departing from the spirit of the invention which is defined by the following claims.

I claim:

1. An educational demonstration model for demonstrating both (1) the principles of balance and center of gravity; (2) the motion of the sun in the heavens, the revolution of the earth about the sun, and the revolution of the moon about the earth, comprising:

a base on which the whole apparatus rests;

an approximately vertical supporting rod secured to and extending upwardly from said base and having a substantially flat surface at its upper end;

a rod having a pointed end which rests on the flat surface and is rotatably balanced thereon;

a relatively large sphere representing the sun secured to the rod at the end thereof opposite to the pointed end;

a bent rod secured to said large sphere at a point removed from the connection to the pointed rod, said bent rod consisting of a substantially vertical portion extending downwardly from said sphere, a substantially horizontal portion extending toward and beyond said vertical supporting rod and an upwardly extending portion;

a sleeve into which said upwardly extending portion of the bent rod is inserted;

a third rod inserted in the end of said sleeve opposite to the upwardly extending portion of the bent rod and extending upward from said sleeve;

a smaller sphere representing the earth secured to the upper end of said third supporting rod;

a collar mounted on said third supporting rod to rotate thereon;

a fourth rod secured to said collar to rotate about said third rod; and a still smaller sphere representing the moon mounted on the end of the fourth rod opposite to the collar;

whereby the large sun sphere may move around said supporting rod, the smaller earth sphere may move around said large sphere, and the smallest moon sphere may move around said smaller earth sphere; and a counter weight comprising a slidable cylindrical member formed with a longitudinal axial bore, the horizontal portion of the bent rod passing through said bore, the weight being movably and slidably mounted on the horizontal portion of the bent rod to maintain the apparatus in proper relationship.

* * * * *